United States Patent [19]

Jacob

[11] Patent Number: 5,242,329

[45] Date of Patent: Sep. 7, 1993

[54] CONSTANT VELOCITY JOINT HAVING ALTERNATING GROOVES

[75] Inventor: Werner Jacob, Frankfurt/Main, Fed. Rep. of Germany

[73] Assignee: GKN Automotive AG, Siegburg, Fed. Rep. of Germany

[21] Appl. No.: 773,343

[22] Filed: Oct. 7, 1991

[30] Foreign Application Priority Data

Oct. 8, 1990 [DE] Fed. Rep. of Germany ....... 4031820

[51] Int. Cl.$^5$ .............................................. F16D 3/223
[52] U.S. Cl. ..................................... 464/145; 464/906
[58] Field of Search ........................ 464/139, 141–146, 464/906

[56] References Cited

U.S. PATENT DOCUMENTS

| | | | |
|---|---|---|---|
| 2,325,460 | 7/1943 | Amberg | 464/145 X |
| 2,875,600 | 3/1959 | Miller, Jr. | 464/145 |
| 3,133,431 | 5/1964 | Zech | 464/144 |
| 3,447,341 | 6/1969 | Miller, Jr. | 464/144 |
| 3,475,924 | 11/1969 | Aucktor | 464/144 |
| 4,019,347 | 4/1977 | Krude | 464/906 X |
| 4,185,476 | 1/1980 | Krude | 464/145 |
| 4,608,028 | 8/1986 | Welschof et al. | 464/145 |
| 4,968,287 | 11/1990 | Jacob | 464/145 |
| 5,067,929 | 11/1991 | Krude | 464/145 |

FOREIGN PATENT DOCUMENTS 3739867 3/1990 Fed. Rep. of Germany .

*Primary Examiner*—Daniel P. Stodola
*Assistant Examiner*—William G. Battista, Jr.
*Attorney, Agent, or Firm*—Harness, Dickey & Pierce

[57] ABSTRACT

A contact velocity universal joint has inner and outer members, balls and a cage. The inner member and the outer member are provided with undercut-free first outer running grooves and opposing first running grooves and second outer running grooves and opposing second inner running grooves starting from different sides of the joint. To achieve the required guiding conditions for the cage, the cage control angle $\beta$ is always greater than 7°, with the cage not requiring any guidance by the outer or inner members.

7 Claims, 2 Drawing Sheets

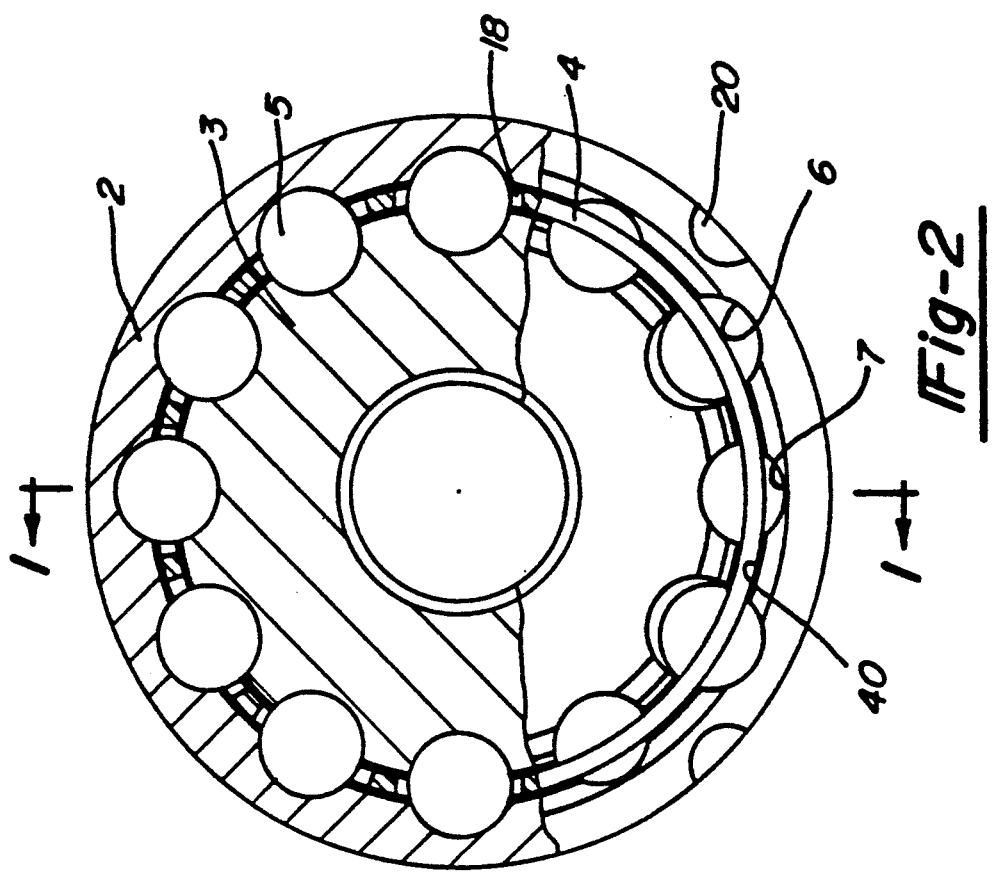
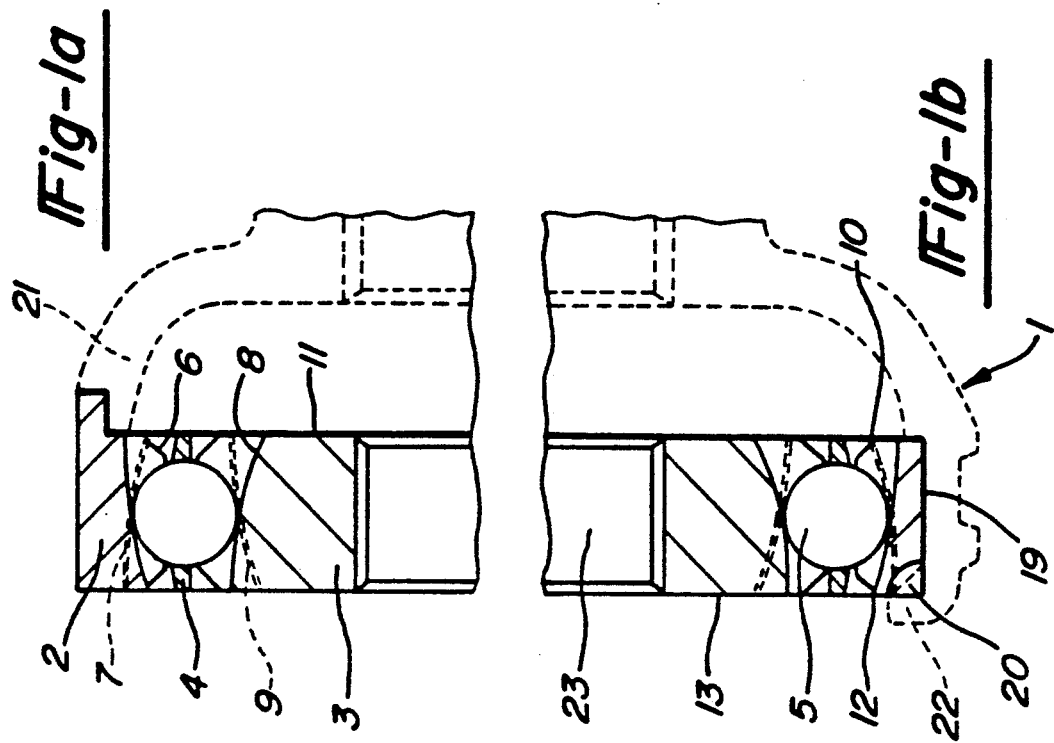

CONSTANT VELOCITY JOINT HAVING ALTERNATING GROOVES

BACKGROUND OF THE INVENTION

The invention relates to a constant velocity universal joint having a hollow outer member with a central cavity whose inner face, in meridian planes, is provided with first and second outer running grooves. The running grooves extend along the longitudinal axis of the outer member and alternate on the circumference. An inner member is arranged in the central cavity of the outer member. The inner member has a spherical outer face which, in meridian planes, is provided with first and second inner running grooves. The grooves extend along the longitudinal axis of the inner member and are positioned opposite the respective first or second outer running grooves. Each running groove is undercut-free starting from one of the two opening end faces of the outer member and inner member. For torque transmitting purposes, each set of opposing outer and inner opposing running grooves jointly accommodate a ball which is guided radially in windows of a cage arranged between the outer face of the inner member and the inner face of the outer member.

U.S. Pat. No. 3,133,431 discloses a joint with tracks for torque transmitting balls. The tracks may optionally be undercut-free towards their two open ends. The joint is designed as a plunging joint. For a joint with a cage, the tracks extend in a straight line. For a cage-less joint, the tracks, in addition to extending at an angle in the meridian plane, are curved in a plane which extends at a right angle to the meridian plane. Only when the tracks extend in a straight line is it possible for the tracks to be undercut-free.

GB-PS 847 569 describes a fixed joint with tracks, which extend with a radius, for torque transmitting balls extending in meridian planes. The radii of the track bases of two track pairs opening in opposite directions is offset relative to the joint center. The joint has a ball guiding cage designed as a hollow spherical dish. The cage and outer part and inner part of the joint are provided with concentric spherical faces to mutually guide each other. The ball tracks and the guiding track of the cage are undercut and therefore cannot simply be produced by precision forming.

In the case of the said design principles, the forces acting on the cage are offset by the alternate openings of the tracks for the ball. However, this does not happen in all operating conditions because the contact of the balls in the tracks over the entire range of articulation angles changes, which inter alia results in a change of direction of the load applied to the cage, thus placing the cage is in an unstable condition. Joints whose tracks extend in a straight line in meridian planes are subject to a further disadvantage in that, towards one end of each track, the track depth which is decisive for the torque transmitting capacity is decreased considerably.

It is the object of the present invention to provide a joint which exhibits stable guiding conditions over the entire range of articulation angles and whose outer and inner members can be produced in a non-chip forming manner by precision forming.

This object is achieved in the present invention for both directions of rotation, over the entire range of articulation angles and in all rotational angular positions. The contact tracks of the balls in first and second outer running grooves of the inner member are traced by opposing contact points of the balls in the sets of outer and inner opposing running grooves. The contact points and center of balls define a cage control angle which is always greater than the self-inhibitions angle and greater than 7°.

SUMMARY OF THE INVENTION

In accordance with the teaching of the invention, cage guidance on the inner member and in the outer member is eliminated as a result of the undercut-free running grooves alternatively extending in opposite directions because in all angular positions of the cage relative to the outer member and inner member, a defined, stable position for the case is ensured by the control conditions. The balls of the first running tracks defined by opposing inner and outer grooves always load the cage in the one direction and the balls of the second running tracks defined by opposing inner and outer grooves load the cage in the opposite direction. As a result, the cage is always held so as to be positioned accurately. The forces exerted by the balls are balanced. There is no need for the cage to be guided relative to the inner part or outer part. This also has an advantageous effect on the friction conditions.

The extension of the contact tracks and thus the extending and cross-section of the sets of opposing outer running grooves and inner running grooves, in the respective meridian planes, is preferably determined on the basis of the most advantageous control conditions and production possibilities.

Non-chip forming production of the outer joint part from both open end faces is made possible by inserting tools from the end faces. The inner face of the outer joint member is formed without the need for any subsequent machining. For instance, the running grooves leading to the open end faces, which are straight, are slightly inclined relative to the longitudinal axis in order to facilitate extraction of the tools during precision forming, e.g. precision forging.

The application of this kind of production with reference to constant velocity fixed joints in which the ball tracks all open in one direction and the cage is guided on the inner part has already been described in U.S. Pat. No. 4,978,287 the specification of which is expressly incorporated by reference.

Furthermore, it is proposed that the contact tracks traced by the individual contact points across the articulation range should be arranged at a predetermined distance from the groove edge at the inner face of the outer member and from the groove edge at the outer face of the inner member and the inner running groove. The predetermined distance is always greater than half the amount of the large axis of the pressure ellipse permissible for the respective angle of articulation and the associated torque. In this way, overloading of the joint is effectively prevented. This can be achieved by providing the outer grooves and inner grooves in respect of their cross-section with a shape which deviates from a circular shape.

As a result, under articulation conditions, contact of the balls at the groove wall can be selected such that there exists a sufficient distance from the groove edge of the running groove.

Furthermore, it is proposed that in the regions of the contact tracks towards their axial ends, the large axis of the pressure ellipse is shorter than the central region of the contact tracks.

This design ensures that if the track depth decreases towards the ends of the inner and outer running grooves, the contribution of the individual balls towards torque transmission may be controlled. This may be achieved by two alternative track designs. According to a first alternative, this is achieved by increasing the osculation between the ball and contact track towards the axial end regions of the contact track. In the second alternative, this is achieved by increasing the cross-section of the ball tracks towards the axial end regions, e.g. it is possible to change the contact track by introducing a smaller contact angle to change the degree of osculation.

Preferably, the outer member has an annular shape and, on its outer face and/or its end face, is provided with circumferentially distributed recesses. The outer member can be received in a sleeve or bell whose wall is form-fittingly connected to the recesses through non-chip forming deformation.

BRIEF DESCRIPTION OF THE DRAWINGS

A preferred embodiment of the invention is diagrammatically illustrated in drawings wherein FIG. 1a is a sectional view of a constant velocity joint of the present invention like that through line 1—1 of FIG. 2.

FIG. 1b is a sectional view like that of FIG. 1a illustrating an alternate embodiment.

FIG. 2 is a partial sectional plan view of the joint of FIG. 1.

DETAILED DESCRIPTION OF THE PREFERRED EMBODIMENT

Figure 4:
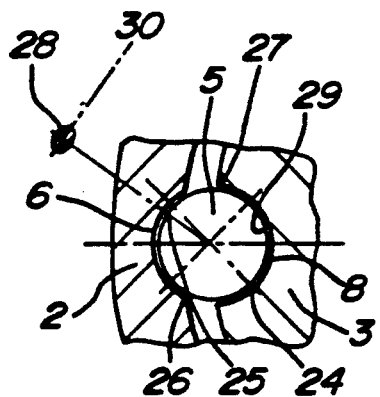
FIG. 4 is a sectional partial view of the joint of FIG. 3 through line 4—4 thereof.

The constant velocity joint 1 as illustrated in FIG. 1 includes an outer member 2, inner member 3, cage 4 arranged between the outer member 2 and the inner member 3 and balls 5 held by the cage 4. The balls 5 transmit torque between the outer member 2 and the inner member 3. The joint has a longitudinal axis which is coaxial with the longitudinal axes of the inner and outer members at zero articulation. The extended position of the constant velocity joint is illustrated in FIG. 1 wherein the radial axes of all joint components are in a common meridian plane that is perpendicular to the x axis. Transmission of torque between the outer member 2 and the inner member 3 is effected, via the balls 5, which engage the opposed first and second inner running grooves 8 and 9 of the inner member 3.

There are two different types of running grooves in the outer member 2. The first type of running grooves 6 open towards the first end face 10 of the outer member 2 and are undercut-free. First outer running grooves 6 are arranged opposite first inner running grooves 8 of the inner member 3.

The first inner running grooves 8 extend from the first end face 11 of the inner member 3 and are undercut-free. The first outer running grooves 6 and inner running grooves 8 are arranged in opposing pairs (see FIG. 2).

The second outer running grooves 7 of the outer member 2 and the opposed second inner running grooves 9 of the inner member 3 are shown in dashed lines in FIG. 1. Grooves 7 and 9 are circumferentially offset relative to the first inner and outer running grooves 6 and 8. The second outer running grooves 7 start from the second end face 12 of the outer member 2 and are undercut-free. The second inner running grooves 9 start from the second end face 13 of the inner member 3 and are undercut-free. The webs 40 arranged between the outer running grooves 6 and 7 follow each other in the circumferential direction from the inner face 14 of the outer member 2 which is cylindrical (see FIG. 3). The outer face 15 of the inner member 3 is a spherical surface.

The cage 4 arranged between the inner face 14 of the outer member 2 and the outer face 15 of the inner member 3 has a spherical outer face 16 and a cylindrical inner face 17 arranged opposite the outer face 15 of the inner member 3.

The running grooves 6, 7, 8 and 9 of the outer member 2 and inner member 3 may be produced in a non-chip forming way. The outer member 2, for example, may be produced from a ring shaped blank by introducing tooling from the two open ends of the ring. The tooling introduced from one open end forms the contour of the first outer running grooves 6 and the tooling introduced from the other open end forms the contour of the second outer running grooves 7. The cage 4 is arranged with play relative to the inner face 14 of the outer member 2 and relative to the outer face 15 of the inner member 3. The cage 4 is centered by the balls 5 which are held, but radially movable, in windows 18 of the cage 4. The function of cage 4 is to hold the balls 5 and substantially no force is applied to the cage. The cage may be made of plastic or it may be made of bent and welded steel strip.

The outer member 2 is annular and at its outer circumferential face 19, towards the end face 12, it has circumferentially distributed recesses 20. In the embodiment shown in the lower half of FIG. 1, the outer circumferential face 19 of the outer member 2 is received in a bell 21. The bell end face 22 is deformed after completion of the assembly operation forcing bell material into the recesses 20 of the outer member 2. This deformation produces a non-rotating attachment between the outer member 2 and the bell 21. The bell 21 is connected with a driving or driven connecting element, e.g. the drive journal of a motor vehicle drive. Alternatively, as shown in the upper half of FIG. 1, the bell 21 may be connected directly to the outer part 2 by a low-distortion welding process, e.g. laser beam welding.

The inner part 3 is provided with a bore 23, which can be a toothed bore, for connecting a driveshaft, a driving journal or the like. Depending on the size of the design angle $\alpha$ of articulation, the assembly of such a joint may be effected by over-articulation or by breaking the outer member 2 into two ring halves or segments after it has been finished produced to its final dimensions. The irregular contour resulting from breaking the outer member 2 ensures accurate relative centering of the two outer member 2 segments into their original position. There is no need for any further centering means.

Figure 5:
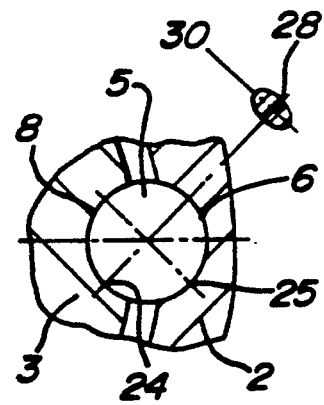
FIG. 5 is a sectional partial view of the joint of FIG. 3 through line 5—5 thereof.
Figure 3:
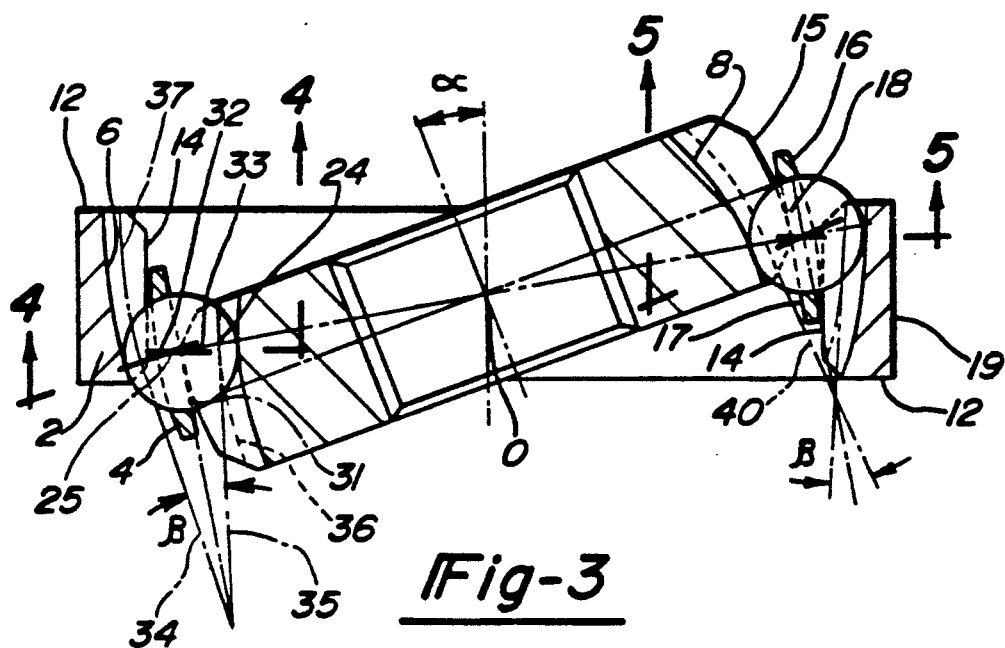
FIG. 3 is a sectional view of the joint of FIG. 1.

FIGS. 3 through 5 show additional contact conditions between the balls 5 and the first running grooves 6 and 8 in the different positions of articulation around the articulation center 0 at maximum articulation. The location of the contact points 24 and 25 may be gathered from the different views. The contact points 24 and 25 for different angular positions are treated in contact tracks 36 and 37, respectively.

FIG. 4 (detail) shows the position of the two contact points 24 and 25 relative to the running groove edges 26 and 27. A pressure ellipse 28 resulting from the osculation conditions between the balls 5 and the running groove flank 29 of the first running grooves 6 and 8 is associated with the individual contact points 24 and 25. In each case, the distance of the contact points 24 and 25 from the running groove edges 26 and 27 is calculated to be such that it is greater than half the distance of the greatest axis 30 of the pressure ellipse 28. Only under these conditions is it possible to avoid deformation of the running groove edges 26 and 27 at high torques.

The cage control angle $\beta$ (FIG. 3) is the angle which ensures that, with reference to the first running grooves 6 and 8, the balls 5 always load the cage 4 against the cage window face 31 nearest to the first end face 10 and first end face 11 respectively (FIG. 1) and, with reference to the second running grooves 7 and 9, against the cage window face nearest to the second end face 12 and second end face 13, respectively. For this purpose, the cage control angle $\beta$, with reference to one rotation of the joint, has to exceed a certain value in all articulation positions and also in all rotational positions in order to achieve the guiding conditions in accordance with the present invention, e.g. to be able to arrange the cage 4 with play and ensure its stability relative to the outer member 2 and inner member 3. For the joint of this invention, this angle always has to be greater than the self-inhibition angle, e.g. greater than 7°. As can be seen in FIG. 3, the cage control angle $\beta$ is the angle between lines 34 and 35 which intersect contact points 25 and 24, respectively, and which are perpendicular to lines 32 and 33, respectively. Lines 32 and 33 connect the ball center with contact points 25 and 24, respectively. In this context it should be noted that the contact points 24, 25 themselves are not positioned in the drawing plane. The most critical position for dimensioning purposes is the position assumed by the ball 5 at the top of FIG. 3 and in FIG. 4. For this position, the angle $\beta$ must be at least 7°. With an off-set controlled joint for example, these conditions, e.g. the angle $\beta$ and position of ball 5, are ensured if the angle of offset of all running grooves relative to the joint center is also at least 7°, but preferably greater. When the angle of offset for all running grooves is at least 7°, the angle $\beta$ for the ball 5 shown at the top of FIG. 3 will always exceed the value of 7°. For the other positions of the balls 5, the angle $\beta$ becomes greater so that the desired guiding conditions and thus contact conditions for the cage 4 are always obtained for the balls 5. For the second running grooves 7 and 9, the same conditions are obtained in a mirror-image relationship, with the $\beta$ angle extending from the second end face 12 side.

The special contact conditions and thus control conditions cannot only be achieved by contact tracks 36 and 37 designed like a circular arch, but by any contact track shape. However, the contact points, as a function of articulation and movement of the balls 5 in the outer running grooves 6 and 8 and inner running grooves 7 and 9, have to be designed in such a way that the minimum cage control angle $\beta$ of 7° and the required distance between the contact points 24 and 25 and the running groove edges 26 and 27 are achieved for the individual positions. For instance, the composite track shape of the running grooves 6 and 8, 7 and 9 with gothic or elliptical cross sections may be designed on the basis of the above criteria. Preferably, the track cross section should be such that a two-point contact is ensured, and under torque and depending on the direction of rotation, one of the contact tracks establishes an operating connection with the ball 5 at the running groove flank 29.

What is claimed is:

1. A constant velocity universal joint comprising a hollow outer member having two end faces and with a central cavity whose inner face, in meridian planes, is provided with first and second outer running grooves extending on the longitudinal axis of the outer member and which alternate on the inner face with respect to one another; an inner member having two end faces and arranged in the central cavity of the outer member, said inner member has a spherical outer face which, in meridian planes, is provided with first and second inner running grooves extending on the longitudinal axis of the inner member, and which alternate on the outer face with respect to one another and are positioned opposite the respective first or second outer running grooves, said grooves are undercut-free with both the first running grooves starting from one of the two end faces of said grooves and both the second running grooves starting from the other end face, a ball is accommodated in each set of opposing running grooves for transmitting torque, a cage including a plurality of windows is arranged between the outer face of the inner member and the inner face of the outer member for both directions of rotation, said cage is centered by said balls with said balls guided radially in said windows, a gap is between said cage and said inner and outer faces to provide play between said cage and said faces so that force is not applied on said cage, over the entire range of articulation angles and in all rotational angular positions, contact tracks of the balls in the first and second outer running grooves of the outer part and in the first and second inner running grooves of the inner part are traced by opposing contact points of the balls in the sets of opposing running grooves, and a cage control angle defined by the contact points and the center of the balls, said cage control angle having an angle greater than a predetermined angle.

2. A constant velocity universal joint according to claim 1, wherein said contact tracks formed by the contact points across the articulation range of the joint are a predetermined distance from the edge of the outer running grooves at the inner face of the outer member and from the edge of the inner running grooves at the outer face of the inner member, the predetermined distance being greater than half the distance of the large axis of a pressure ellipse resulting from osculation conditions between the balls and running grooves for the respective angle of articulation and the associated torque of the joint, the axis of the pressure ellipse extending from the center of each ball to its contact point in the outer running groove.

3. A constant velocity universal joint according to claim 2, wherein towards axial end regions of the contact tracks the large axis of the pressure ellipse is shorter than in a central region of the contact tracks.

4. A constant velocity universal joint according to claim 3, wherein the osculation between each ball and its contact tracks increases towards the axial end regions of the contact tracks.

5. A constant velocity universal joint according to claim 3, wherein the cross section of each set of opposing running grooves increases toward the axial end regions.

6. A constant velocity universal joint according to claim 1, wherein the cross sectional shape of each set of opposing running grooves deviates from a circular shape.

7. A constant velocity universal joint according to claim 1, wherein the outer member has an annular shape and, on the edge of its outer face and end face has circumferentially distributed recesses, the outer member is received in a member which is form-fittingly connected to the outer member through non-chip forming deformation which forces material from the member into the recesses.

* * * * *